T. BLACK.
Cultivator.
No. 29,758. Patented Aug. 28, 1860.
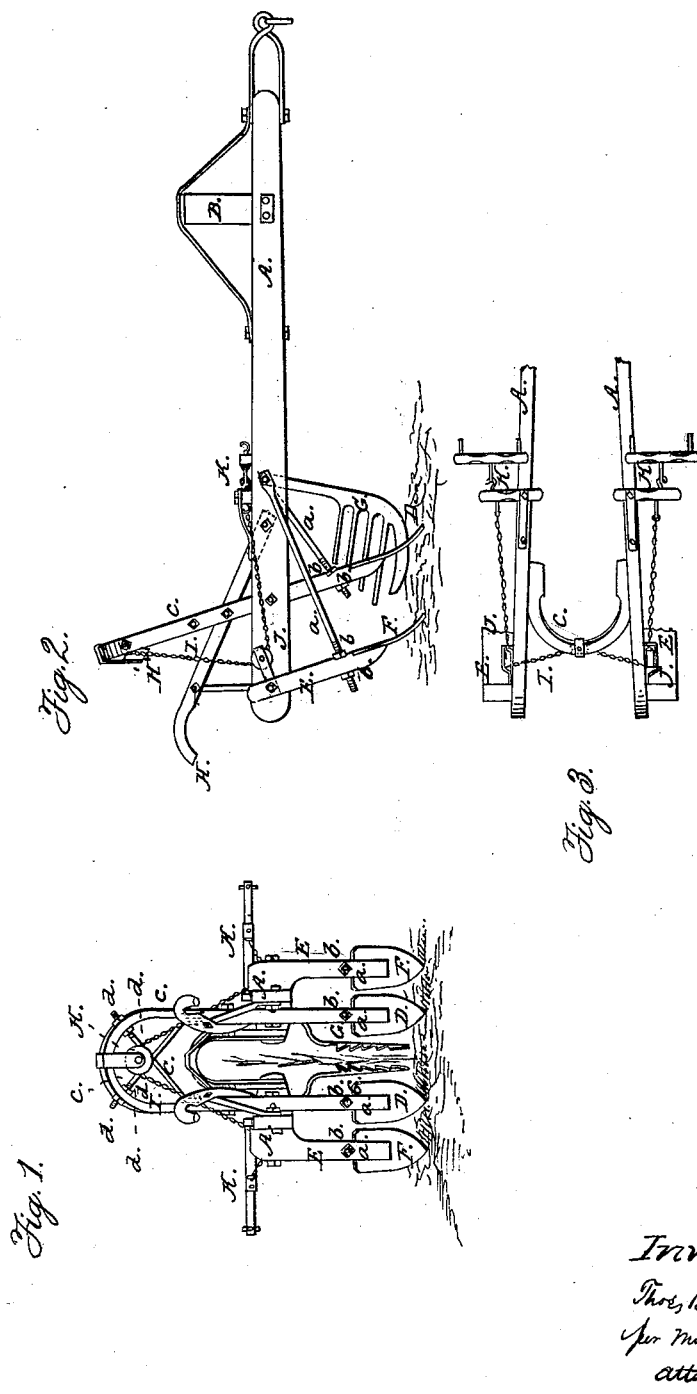

UNITED STATES PATENT OFFICE.

THOMAS BLACK, OF PRINCEVILLE, ILLINOIS.

IMPROVEMENT IN CULTIVATORS.

Specification forming part of Letters Patent No. 29,758, dated August 28, 1860.

*To all whom it may concern:*

Be it known that I, THOMAS BLACK, of Princeville, in the county of Peoria and State of Illinois, have invented a new and Improved Cultivator; and I do hereby declare that the following is a full, clear, and exact description of the same, reference being had to the annexed drawings, making a part of this specification, in which—

Figure 1 is a back view of my invention; Fig. 2, a side elevation of the same; Fig. 3, a plan of a portion of the same.

Similar letters of reference indicate corresponding parts in the three figures.

The object of this invention is to obtain a cultivator that may be used for plowing or operating among plants of various heights without injuring the same, due provision being made against the breaking down of large plants by the passing along of the implement, and suitable protection being afforded small plants against clods, stones, &c., which may be cast toward them by the action of the shares.

The invention also has for its object the equalizing of the draft, so as to insure an equal "pull" on each beam of the implement and a perfect operation of the same.

To enable those skilled in the art to fully understand and construct my invention, I will proceed to describe it.

A A represent two beams, which are connected by two bow-shaped traverse-bars, B C. The front bar, B, has its ends connected to the beams, but the bar C has its sides connected to the beams, the sides of the bar extending down below the beams and forming feet or standards, which have shares D attached.

To the back part of each beam A a foot or standard, E, is secured, each of which has a share, F, at its lower end. The standards E E and lower parts of the bar C are braced from the beams A by rods *a*, which have screw-threads cut on their ends to receive jam-nuts *b b*, which bear against the back and front sides of the standards, as shown clearly in Fig. 2.

The bar C has diagonal cross-rods *c c* connecting its two sides, the upper ends of the rods having screw-threads cut on them, on which jam-nuts *d* are fitted, a jam-nut being at each side of the bar on each rod, as shown clearly in Fig. 1. By turning these jam-nuts the sides of the bar C, and consequently the beams A A, may be adjusted nearer together or farther apart, as may be desired. This will be fully understood by referring to Fig. 1. The shares D F may be of any proper form. The shovel form, however, as shown in Fig. 1, would probably be most desirable.

To the inner side of each beam A a metal fender or guard, G, is attached. These fenders or guards are made in the form of a grating. Their front sides or edges are curved, as shown clearly in Fig. 2, and they occupy a position at the inner sides of the front shares, D, and there is a sufficient space between them to admit of their passing along, one each side of the plants, as shown clearly in Fig. 1. The fenders or guards may also be attached to the beams in such a way as to admit of being raised and lowered as occasion may require.

To the upper and back part of the bar C there is a pulley, H, attached, over which a chain, I, passes, said chain extending down and passing under pulleys J J at the outer side of each beam A, the ends of the chains being connected to double-trees K K, which are attached one to each beam, as shown in Fig. 3.

From the above description it will be seen that the bow-shaped traverse-bars B C, which connect the two beams, A A, will admit of the machine passing over quite tall plants as the beams pass along, one each side of a row of plants. Consequently the plants may be cultivated until they have arrived at quite a mature stage of growth.

The shares D F may be adjusted nearer to and farther from the plants by adjusting the jam-nuts *d* of the diagonal rods *c c*, the bar C having sufficient elasticity to permit such result. The fenders or guards G protect the plants from clods of earth, stones, rubbish, &c., which might chance to be thrown against them by the shares. This is an important feature, especially in the cultivation of young plants, as the fenders or guards allow the fine or pulverized earth to pass through, but serve as a barrier to coarse clods, stones, or rubbish.

The connecting of the two double-trees, K K, by the chain I, passing around the pulleys H J J, serves to equalize the draft precisely the same as the single double-tree of an ordinary vehicle, the arrangement admitting of an uninterrupted space between the two beams A A.

I do not claim the employment or use of the plow or cultivator beams A A, placed side by side, for plowing or cultivating both sides of a row of plants; but I do claim as new and desire to secure by Letters Patent—

The arrangement of the elastic traverse bow-bar C, adjustable rods c, bow-bar B, beams A A, double-trees K, chain I, pulleys H J J, beam A, guards G G, standards E, and shares D F, all as herein shown and described, for the purpose set forth.

THOMAS BLACK.

Witnesses:
 PHINEAS BRONSON,
 JOSEPH L. STILLMAN.